United States Patent Office 3,632,608
Patented Jan. 4, 1972

3,632,608
METHODS FOR PREPARING ESTERS AND AMIDES OF TRIMELLITIC ANHYDRIDE AND PRODUCTS THEREFROM
Fred F. Holub, Schenectady, N.Y., assignor to General Electric Company
No Drawing. Original application May 15, 1967, Ser. No. 638,636, now Patent No. 3,435,002, dated Mar. 25, 1969. Divided and this application July 1, 1968, Ser. No. 741,310
Int. Cl. C07d 5/46
U.S. Cl. 260—346.3      4 Claims

ABSTRACT OF THE DISCLOSURE

Esters or amides of trimellitic anhydride can be prepared by reacting the latter directly with either a polyol or a disecondary amine at elevated temperatures and by a rearrangement reaction involving the elimination of water to obtain the ester or amide polyanhydride. Polyamide acid resins and polyimides can be prepared from such compositions.

---

This application is a division of my U.S. patent application Ser. No. 638,636 filed May 15, 1967, and assigned to the same assignee as the present invention, now U.S. Patent 3,435,002, issued Mar. 25, 1969.

This invention is concerned with a process for preparing esters (which term is intended to include thioesters) and amides of trimellitic anhydride. More particularly the invention pertains to a process which comprises effecting reaction at elevated temperatures directly between trimellitic anhydride (which term by definition is intended to include trimellitic acid) and a member selected from the class consisting of polyols (which by definition is intended to include polythiols) and a disecondary amine whereby water is removed at the elevated temperatures to effect formation of a composition corresponding to the formula

I

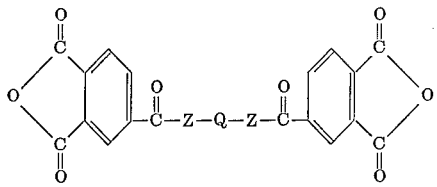

where Z is a member of the class consisting of oxygen, sulfur, and the

radical, and Q is a divalent hydrocarbon radical residue of the polyol or disecondary amine or alkanolamine [e.g., ethylene, propylene, isopropylidene, trimethylene, hexylene and its isomers of the linear formula —C$_6$H$_{12}$—, alkylene arylene (e.g., —CH$_2$—C$_6$H$_4$—CH$_2$,

—CH$_2$C$_6$H$_3$(CH$_3$)CH$_2$— etc.) etc.] where R is a monovalent aliphatic hydrocarbon radical.

U.S. Pat. 3,183,248 describes the preparation of esters of trimellitic anhydride corresponding to Formula I where Z is oxygen and Q is derived from dihydroxy aliphatic hydrocarbons preferably containing from 2 to 12 carbon atoms. In accordance with this patent, trimellitic anhydride is reacted with ethylene glycol diacetate and the reaction mixture heated at elevated temperatures to evolve acetic acid and to form the desired ester of trimellitic anhydride. There are several disadvantages in employing this process for making the esters of trimellitic anhydride. In the first place, it is necessary to convert one of the reactants to the acetate which obviously injects an extra step and adds to the cost of making the ester of trimelliic anhydride. In addition, the time of reaction whereby acetic acid is removed to form the desired ester is exceedingly long and according to the examples varies from about 12 to 16 hours. Furthermore, the evolution of acetic acid requires precautions as to the corrosiveness of the acid.

British Pat. 1,019,568 describes a class of hardeners for epoxy resins in which the hardeners are tetracid adducts of trimellitic anhydride formed from the reaction of a dihydroxy aliphatic hydrocarbon, such as diethylene glycol, etc., by reacting the diol with trimellitic anhydride. However, in this reaction, the reactants are heated at a temperature and for a time required only to form the tetracid. There is no indication in this patent that the formation of the dianhydride of Formula I is caused or even contemplated. From the objective of this patent directed to making the tetracid adduct, water is not a byproduct of the reaction if one is to obtain the tetracid.

Unexpectedly I have discovered that I can prepare dianhydrides of Formula I by effecting reaction between trimellitic anhydride and a glycol or a disecondary amine directly whereby heating at a sufficiently high temperature to remove water, yields not the tetracid as in the above-identified British Pat. 1,019,568, but rather one obtains unexpectedly an intermolecular transesterification to give the dianhydride of Formula I.

The esters (including the thiol esters) and amides of trimellitic anhydride formed by my process have many uses. Thus, they can be used to effect curing of epoxy resins to the substantially infusible and insoluble state; such compositions are especially useful as casting compositions for electrical motors, etc. In addition, these dianhydrides can be reacted with primary diamines such as m-phenylenediamine, ethylenediamine, trimethylenediamine, o,m, or p-xylylenediamine, 4,4'-oxydianiline, 4,4'-methylenedianiline, etc. in the manner described in British patent 570,858 and in U.S. Pat. 3,277,043 issued Oct. 4, 1966, to form polyamide acid resins which can be converted by heat to high temperature polyimides useful as insulation for electrical conductors, as dipping varnishes to impregnate coils of previously insulated wire, for example, in motor generator rotors, field coils, etc.; as molding resins, advantageously employing various fillers; for preparing fibers, as impregnants in bonding materials for metallic and fibrous laminates, etc. The polyimide films are suitable as a dielectric for making capacitors, as slot insulation in motors, etc.

Although the process whereby the intermolecular transesterification takes place is not clearly understood, it is believed that there is selective reaction to form the dianhydride by the elimination of water. Initially, it is believed that the reaction between the trimellitic anhydride and the polyol or disecondary amine yields a tetracid corresponding to the formula

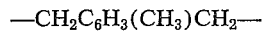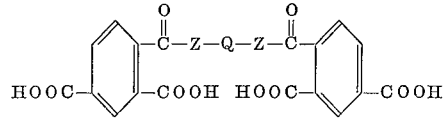

and thereafter molecules of this latter formula interact with each other with the elimination of water and intraversion to form the dianhydride of Formula I, where Z and Q have the meaning given above. In the practice of my invention, it is essential that the temperature be high enough and the reaction be carried out under such conditions that water is eliminated up to the maximum or stoichiometric amount possible by the reaction indicating formation of the dianhydride. By employing my process, one avoids the necessity of making any derivatives of the reactants such as in the aforementioned U.S. Pat. 3,183,248 and one does not have to deal with any corrosive byproduct such as acetic acid. In addition, if the proper temperature conditions are employed at which water of esterification is removed, the reaction takes place in a relatively short period of time of the order of from 10 to 120 minutes at most. The reaction embraced by my process goes essentially to completion so that minimum clean up of the reaction mixture is required to isolate the desired dianhydride.

Among the glycols which may be employed in the practice of the present invention are preferably those having from 2 to 12 carbon atoms and may be wholly aliphatic or may have aromatic substituents therein. Included among such polyols containing terminal hydroxyl groups are the glycols such as ethylene glycol, 1,3-propanediol, 1,4-butanediol, 1,3-butanediol, 1,5-pentanediol, 1,6-hexanediol, 1,8-octanediol, 1,12-dodecanediol, thioglycol

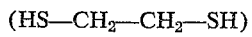

other polythiols corresponding to the various hydroxy terminated compounds recited above; polyols containing other hydrocarbon units such as aromatic units, for example, p-xylene-α,α'-diol, etc.; mixed thioglycols, i.e., those containing both a hydroxy group and a thio alcohol group, for example,

etc.; glycol ethers, for instance, diethylene glycol, triethyleneglycol, etc. Included among the disecondary amines are those, for instance, of the formula

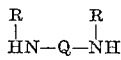

where Q has the meaning given above and R is a monovalent aliphatic hydrocarbon radical (e.g., alkyl, for instance, methyl, ethyl, propyl, isobutyl, etc.; aralkyl, e.g., benzyl, phenylethyl, etc.; alkenyl, e.g., vinyl, allyl, etc.), examples of which are, for instance, N,N'-dimethylethylene diamine, N,N'-dibenzylethylene diamine, N,N'-dibutyl butylene diamine, N-methyl-N'-ethylethylene diamine, N,N'-diallyl propylene diamine, N,N'-diethylpropylene diamine, N,N'-dimethyl-m-phenylene diamine, etc. Disecondary amines containing nitrogen in a ring, e.g., piperazine are also included. Alkane polyols containing three or more hydroxyl groups as, for instance, glycerol, trimethylol propane, pentaerythritol, etc., can also be used in an amount up to 25 mol percent replacement of the diols. Additionally, it should be understood that mixed hydroxyamine derivatives containing an aliphatic substituted hydroxyl group and a monosecondary amine group (hereinafter identified as "alkanolamine") can be employed as, for instance, N-methylethanolamine, N-ethylpropanolamine, etc.

Generally, the reaction can be carried out by direct transesterification of the trimellitic anhydride and the polyol or amine derivative. However, the use of solvents inert to the reactant and reaction product, such as biphenyl, diphenyl ether, chlorinated aromatic hydrocarbons, are not precluded as long as the boiling point of the solvent, whether at atmospheric pressure or under superatmospheric pressure is maintained at a sufficiently high temperature to remove the water of esterification as it is formed.

Generally, one employs a molar ratio of at least two moles of the trimellitic anhydride (or trimellitic acid) to about one mole of the glycol or disecondary amine reactant. The use of a molar excess of the anhydride is not precluded and it is not critical as to what molar concentrations are employed as long as the molar concentration used is that designed to give optimum formation and yield of the desired trimellitic anhydride derivative.

The temperature of reaction is generally not critical as long as the temperature used is sufficient to effect removal of the water of esterification. Generally, this will encompass temperatures of the order of about 175–300° C. or more. Obviously, the temperature employed will determine the rate of removal of the water and as higher temperatures are used, the time for removal of water will be shortened. It is also important that the water be removed from the reaction zone as it is formed in order to avoid hydrolysis of any formed anhydride product.

In order that those skilled in the art may better understand how the present invention may be practiced, the following examples are given by way of illustration.

Example 1

A mixture of 768.52 grams (4.0 mole) trimeliltic anhydride and 124 grams (2.0 mole) ethylene glycol was heated with stirring under a nitrogen sparge at a progressively increasing temperature ranging from about 225–300° C. for about 90 minutes. During this time about 64.9 grams of water was evolved (72 grams are theoretical). A vacuum of 7–8 mm. Hg was applied for 30 minutes at a temperature of about 260° C. The product thus obtained had the formula

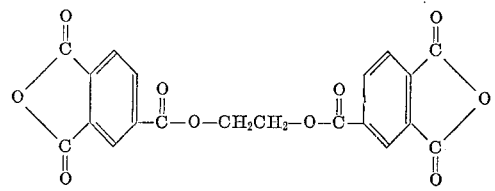

as evidenced by the following analyses:
Calculated (percent): C, 58.4; H, 2.5. Found (percent): C, 58.5; H, 2.5.

Example 2

A mixture of 19.2 grams (0.1 mole) trimellitic anhydride and 6.9 grams of p-xylylene-α,α'-diol (0.05 mole) was reacted in a vessel with stirring for about 15 minutes while the temperature was raisedd uring this period gradually from 225–290° C. During all this time, water of esterification was removed until 1.7 grams water had been obtained (1.8 grams theoretical). The solid product thus obtained melted within the range of 69–75° C. This product was identified as having the formula

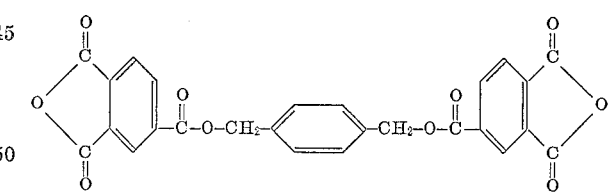

as evidenced by the following analyses:
Calculated (percent): C, 64.0; H, 3.1. Found (percent): C, 62.4; H, 3.2.

Example 3

A mixture of 76.8 grams (0.4 mole) trimellitic anhydride and 17.2 grams (0.2 mole) piperazine was caused to react with stirring for 15 minutes while the temperature was raised gradually during this period from 200–300° C., at the same time removing 7.1 grams of water (7.2 grams theoretical). On cooling, a product having the formula

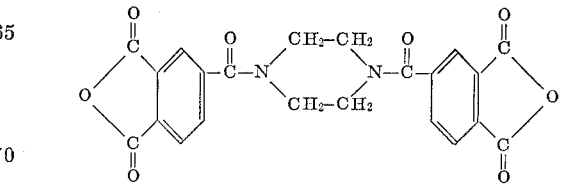

was obtained. This structure was confirmed by the following analyses:
Calculated (percent): C, 60.8; H, 3.24; N, 6.5. Found (percent): C, 59.3; H, 3.47; N, 6.6.

Example 4

In this example, 192.13 grams (1.0 mole) trimellitic anhydride, and 64.5 grams (0.5 mole) neopentyl glycol were mixed with stirring and heated for a period of about 90 minutes during which time the temperature was raised gradually from 195° C. to 300° C. while simultaneously removing a total of 17.7 grams water (18.0 grams theoretical). The product thus obtained had a melting point of 76–78° C. Analysis of the composition showed it to have the structure

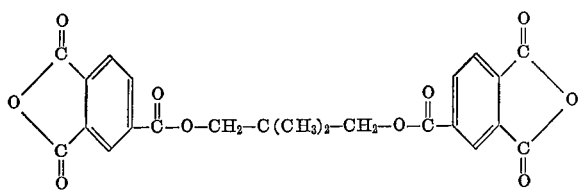

as evidenced by the following elemental analyses:
Calculated (percent): C, 61.2; H, 3.5. Found (percent): C, 60.5; H, 3.9.

Example 5

A thioglycolate ester of trimellitic anhydride having the formula

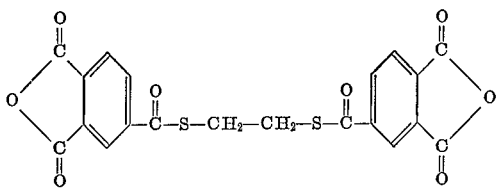

was prepared by effecting reaction at elevated temperatures between 408 grams (2.13 moles) trimellitic anhydride and 100 grams (1.06 moles) dithiolglycol (1,2-ethanedithiol) employing the same conditions as in Example 1 to give the above thiol ester.

Example 6

Into a reaction vessel equipped with stirrer and nitrogen stream were charged 76.8 grams (0.4 mole) trimellitic anhydride and 21.2 grams (0.2 mole) diethylene glycol. The mixture was heated until molten at 178° C. and thereafter further heating caused the pot temperature to rise to 250° C. before any evolution of water was noted. The nitrogen stream was passed through the reaction vessel to assist in the removal of water effluent while the temperature of the reaction vessel was raised progressively to 262° C. The heating was continued for about 60 minutes to yield 86.8 grams (96% yield) of a trimellitate having the formula

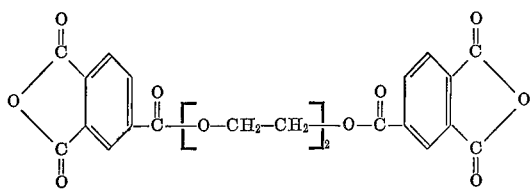

The identity of this composition was established as evidenced by the following analyses:
Calculated (percent): C, 58.2; H, 3.1. Found (percent:) C, 57.2; H, 3.4.

The following example illustrates the preparation of an ethylene glycol-bis-trimellitate in which 10 mole percent of ethylene glycol is replaced by glycerine.

Example 7

In this example 96 grams (0.5 mole) trimellitic anhydride, 13.95 grams (0.225 mole) ethylene glycol, and 2.2 grams (0.025 mole) glycerine were added to a reaction vessel and the mixture stirred and heated for 20 minutes while progressively raising the temperature from 225 to 300° C. This heating was carried out while simultaneously removing about 7 grams of water (7.2 grams theoretical). This ethylene glycol-glyceryl-bis-trimellitate was then formed into a solution by adding the reaction mixture to 378 grams of a mixture of o,p-cresol at 190° C., cooling the solution thus formed to 90° C., and adding 50 grams (0.253 mole) p,p'-methylene dianiline. The mixture was then heated gently at about 45 to 55° C. for 15 minutes to give a polyamide acid ester solution which had an intrinsic viscosity of about 0.11. A film was made by casting a portion of this solution on an aluminum plate, and heating at from 100° to 300° C. progressively to give a tough, flexible, film which had a cut-through temperature of 330° C. as measured by the method described in U.S. Pat. 2,936,296, issued May 10, 1960.

Example 8

This example illustrates the effect of reacting trimellitic anhydride with a polyol under conditions where water is not removed. More particularly, 76.8 grams (0.4 mole) trimellitic anhydride was heated until it was molten and then cooled to around 170° C. at which time 12.4 grams (0.2 mole) ethylene glycol was added rapidly and the mixture stirred to give a crystalline product having a melting point of 215–220° C. This composition was identified as having the formula

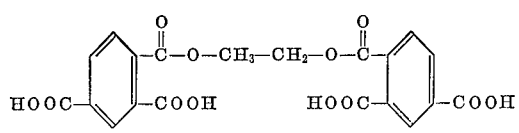

as evidenced by the following analyses:
Calculated (percent): C, 53.8; H, 3.1. Found (percent): C, 53.1; H, 3.2.

Example 9

The composition having the formula

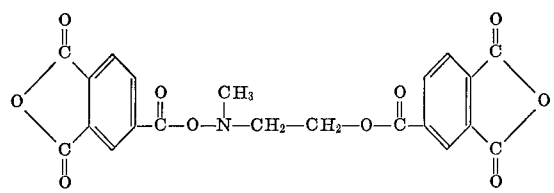

was prepared by effecting reaction between 76.85 grams (0.4 mole) trimellitic anhydride and 15 grams (0.2 mole) N-methylethanolamine and heating the mixture under introgen at a progressively increasing temperature of from 225–260° C. for about 20 minutes sufficient to remove essentially all of the theoretical amount (7.2 grams) of water derived from complete esterification. A vacuum of 8 mm. (Hg) was applied for 10 minutes while the temperature was maintained at about 220° C. This yielded the above bis-anhydride product as shown by the following analyses:
Calculated (percent): C, 59.5; H, 3.1; N, 3.3. Found (percent): C, 59.9; H, 3.0; N, 3.4.

Example 10

To a reaction vessel equipped with stirrer and distillation column furnished with a means for removal of water were charged 76.85 grams (0.4 mole) trimellitic anhydride and 18.81 grams (0.2 mole) β-mercaptoethanol. The mixture was heated with stirring under nitrogen to a temperature of 230° until water began to evolve. The temperature was then increased gradually over a 20-minute period to 290° C. Thereafter a vacuum of 10.8 mm. (Hg) was applied to the system while heating for an additional 20 minutes at around this temperature. This yielded a dianhydride product melting at 158–160° C. and having the following structure:

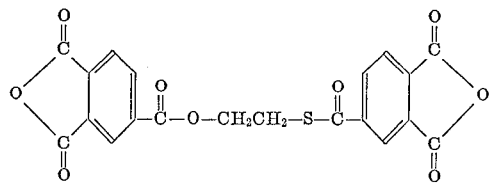

The following example illustrates the ability to make the trimellitate ester by starting with trimellitic acid instead of which trimellitic anhydride as was done in the foregoing examples.

Example 11

To a reaction vessel equipped with a stirrer and a distillation column containing means to remove water were charged 84.06 grams (0.4 mole) of trimellitic acid and 12.4 grams (0.2 mole) ethylene glycol. The mixture was heated with stirring under a nitrogen sparge at a progressively increasing temperature of from 110 to 210° C. while at the same time removing about 7.2 grams of water. The temperature was gradually increased to 290° C. over a 30 minute period during which time an additional 7.0 grams (theoretical 7.2 grams) of water was collected. A vacuum was introduced into the system at about 0.8 to 1.2 mm. mercury and the reaction product heated at 255–280° C. for about 15 minutes. This product was dissolved in acetone, filtered and the acetone solution separated and evaporated leaving a white solid melting at about 156–158° C. This material was found to have the same structure as in Example 1 as shown by the following analyses:

Calculated (percent): C, 58.4; H, 2.5. Found (percent): C, 58.1; H, 2.6.

The following examples illustrate the curing of epoxy resins and the preparation of polyamide acid resins and in turn polyimides obtained from the trimellitate anhydrides prepared above. Cut through temperatures were determined by the method described in U.S. Pat. 2,936,296.

Example 12

To a reaction vessel flushed with nitrogen were charged 36.2 grams N-methyl pyrrolidone, 4.0 grams (0.02 mole) p,p'-methylene dianiline and 8.2 grams (0.02 mole) of the trimellitate of Example 1. The reaction mixture was heated for a short period of time at about 25–50° C. to give a polyamide acid of about 25% solids in the N-methyl pyrrolidone solvent. Films cast on a glass surface from this solution were then heated at 100° C. for one hour, at 150° C. for one hour, and at 225° C. for one hour. The polyimide films thus obtained were flexible and had a cut-through temperature of 280° C.

Example 13

A liquid coating solution was prepared by dissolving 5.6 grams of the ester dianhydride prepared in Example 1 and 10 grams of an epoxy resin (Epon 828 sold by Shell Development Co.) in acetone to approximately 50% solids. The liquid coating was applied to a glass panel which was then heated for one hour at 150° C. to yield a cured film which was extremely flexible and had a cut-through temperature of 365° C.

Example 14

A polyimide resin was prepared by charging a reaction vessel with 22.5 grams p,p'-methylene dianiline, 220.5 grams N-methyl pyrrolidone and 57 grams of the trimellitate of Example 4. The reaction mixture was heated gently at about 55 to 60° C. for about 15 minutes to give a polyamide acid resin of about 25% solids. A film was prepared therefrom by casting a portion of the solution on a glass plate and heating the film for one hour at 100° C., one hour at 150° C., and one hour at 200° C. to give a polyimide film which was extremely flexible and had a cut-through temperature of 200° C.

Example 15

A liquid coating solution was prepared by dissolving 6.16 grams of the trimellitate of Example 4 and 10 grams of an epoxy resin (Epon 828 sold by Shell Development Co.) in acetone to approximately 50% solids. The liquid coating solution was applied to a glass panel and cured at 150° C. for one hour to yield a cured film which was quite flexible and had a cut-through temperature of 365° C.

Example 16

A polyamide acid resin was prepared by charging a reaction vessel with 6.34 grams of p,p'-methylene dianiline, 80 grams N-methyl pyrrolidone, and 13.6 grams of the trimellitate of Example 6. The mixture was heated gently at about 45 to 55° C. for about 15 minutes with stirring to give a polyamide acid resin of about 20% solids. Films were cast from this solution on a glass plate and then heated at 100° C. for one hour, 150° C. for one hour, and at 200° C. for one hour to give a polyimide film which had a cut-through temperature of 130° C.

EXAMPLE 17

A liquid coating composition was prepared by dissolving 5.6 grams of the trimellitate of Example 6 and 10 grams of an epoxy resin (Epon 828 sold by Shell Development Co.) in acetone to approximately 50% soldis. The liquid coating was applied to a glass panel and heated at 150° C. for one hour to give a cured film which was flexible and had a cut-through temperature of 350° C.

The process of the present invention is capable of preparing a number of compositions some of which have already been described above. In addition to those previously described, a number of other compositions can be described generically as having the formula

II

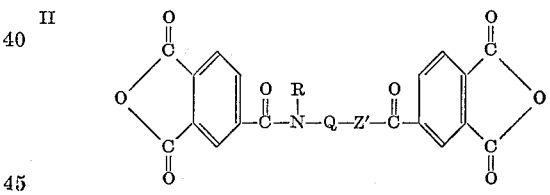

where Z' is a member of the class consisting of oxygen and the

radical, where R and Q have the meanings given above. The methods and ingredients used to prepare these compositions are described previously.

It will also be apparent that in addition to polyamide acid resins described above prepared from the many trimellitic anhydride compositions obtained in accordance with my process, other polyamide acid resins can be formed from their reaction with a variety of other diamino compounds. These polyamide acid resins in turn can be heated at elevated temperatures above 50° C., and preferably above 200–300° C. or higher to form the polyimide compositions.

It will of course be apparent to those skilled in the art that in addition to using the trimellitic anhydride, the trimellitic acid can be used in its place with equivalent results. Also, other polyols and disecondary amines can be employed in place of those recited in the foregoing examples to yield numerous other trimellitic derivatives. Furthermore, the ingredients used to make the polyamide acids and polyimide resins can be varied widely in order to yield a multitude of new and useful resinous compositions. The conditions of reaction can be varied widely in accordance with the disclosures and teachings of the foregoing description.

What I claim as new and desire to secure by Letters Patent of the United States is:

1. The process for making compounds of the formula

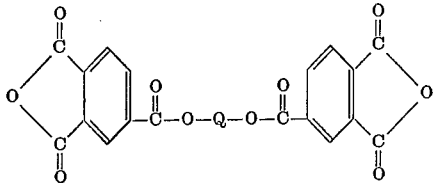

where Q is a divalent radical selected from the class consisting of divalent saturated aliphatic radicals of from 2 to 12 carbon atoms, the —$CH_2CH_2$—O—$CH_2CH_2$— radical, and the

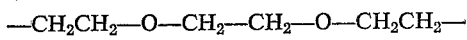

radical, the parameters of Q being determined by the glycols listed hereinafter, which process comprises (1) forming a mixture of ingredients containing as the only essential ingredients trimellitic anhydride and an aliphatic glycol selected from the class consisting of ethylene glycol, 1,3-propanediol, 1,4-butanediol, 1,3-butanediol, 1,5-pentanediol, neopentyl glycol, 1,6-hexanediol 1,8-octanediol, 1,12-dedecanediol, diethylene glycol, triethylene glycol, (2) heating the mixture of ingredients at a temperature within the range of 175–300° C. while simultaneously removing the water formed as the result of the reaction between the ingredients, there being employed at least 2 mols of the trimellitic anhydride per mol of the aliphatic glycol, and (3) isolating the formed dianhydride.

2. The process as in claim 1 in which the aliphatic compound is ethylene glycol.

3. The process as in claim 1 in which the aliphatic compound is diethylene glycol.

4. The process as in claim 1 in which the aliphatic compound is neopentyl glycol.

References Cited
UNITED STATES PATENTS

| | | | |
|---|---|---|---|
| 3,140,299 | 7/1964 | Loncrini | 260—346.3 |
| 3,182,073 | 5/1965 | Lonchrini | 260—346.3 |
| 3,183,248 | 5/1965 | Hirsct et al. | 260—346.3 |
| 3,213,091 | 10/1965 | Reynolds | 260—268 X |
| 3,225,065 | 12/1965 | Hyde | 260—346.3 |
| 3,277,117 | 10/1966 | Van Strien et al. | 260—346.3 |
| 3,410,875 | 11/1968 | Holub | 260—346.3 |
| 3,437,671 | 4/1969 | Sandler et al. | 260—346.3 |
| 3,453,292 | 7/1969 | Izumi et al. | 260—268 X |

DONALD G. DAUS, Primary Examiner

U.S. Cl. X.R.

260—465, 268 C, 268 T, 268 BC, 268 PC, 578, 583 R, 609 A, 609 F, 635 R